(12) United States Patent
Park et al.

(10) Patent No.: US 8,116,018 B2
(45) Date of Patent: Feb. 14, 2012

(54) LENS ACTUATING MODULE

(75) Inventors: Jae Hyuk Park, Gyunggi-do (KR);
Byung Hoon Kang, Seoul (KR); Chul Yeub Han, Gyunggi-do (KR); Jung Wook Hwang, Gyunggi-do (KR); Hyun Phill Ko, Gyunggi-do (KR); Soo Cheol Lim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 280 days.

(21) Appl. No.: 12/609,952

(22) Filed: Oct. 30, 2009

(65) Prior Publication Data

US 2011/0063741 A1    Mar. 17, 2011

(30) Foreign Application Priority Data

Sep. 11, 2009    (KR) .................. 10-2009-0085953

(51) Int. Cl.
*G02B 7/02* (2006.01)

(52) U.S. Cl. ....................................... 359/823

(58) Field of Classification Search .................. 359/676, 359/694, 823
See application file for complete search history.

(56) References Cited

U.S. PATENT DOCUMENTS 6,215,605 B1    4/2001    Kuwana et al.
7,295,389 B2 *  11/2007   Ohtsuka et al. ............... 359/819

\* cited by examiner

*Primary Examiner* — Joseph P Martinez
(74) *Attorney, Agent, or Firm* — Blakely Sokoloff Taylor & Zafman LLP (57) ABSTRACT

Disclosed herein is a lens actuating module. The module includes a housing having an accommodating space and a bush guide. A lens barrel is accommodated in the accommodating space and includes a lens and a barrel hook. A driving unit applies a driving force to a bush such that it is moved up in the direction of the optical axis, by pulling force of contraction of a shape memory alloy wire. The bush is guided by the bush guide and engages with the barrel hook. A rotary member is interposed between the housing and the lens barrel. A preload unit pulls the lens barrel in the direction of the optical axis such that the lens barrel moves down to an original position, and pulls the lens barrel in a direction perpendicular to the optical axis to maintain a contact of the lens barrel with the rotary member.

10 Claims, 11 Drawing Sheets

FIG.1

Prior art

FIG.2

Prior art

LENS ACTUATING MODULE

CROSS REFERENCE TO RELATED APPLICATION(S)

This application claims the benefit of Korean Patent Application No. 10-2009-0085953, filed on Sep. 11, 2009, entitled "Lens Actuating Module", which is hereby incorporated by reference in its entirety into this application.

BACKGROUND OF THE INVENTION

1. Technical Field

The present invention relates to a lens actuating module.

2. Description of the Related Art

Generally, personal portable terminals such as an electronic device, a mobile phone or a PDA have additional functions as well as a main function. Currently, many electronic devices additionally have a camera function, so that they appeal to consumers. Thus, a market for camera modules mounted on the electronic devices has been gradually expanding.

In order to satisfy the demand of the market, the camera module has been developed to have additional functions including an auto-focusing function, an optical zoom function, and an Optical Image Stabilization (OIS) function, in addition to a fixed focus function.

Especially, in order to realize the additional functions of the camera module including the auto-focusing function, the optical zoom function, and the OIS function, a lens transfer module using an actuator for transferring a lens, for example, an actuator of a step motor type, a Voice Coil Motor (VCM) type, or a piezoelectric type is essentially required. In recent years, as the personal portable terminals require the composition of multiple functions and miniaturization, the camera module applied to the personal portable terminal mainly uses the piezoelectric type which is advantageous in terms of miniaturization and reliability.

Figure 1:
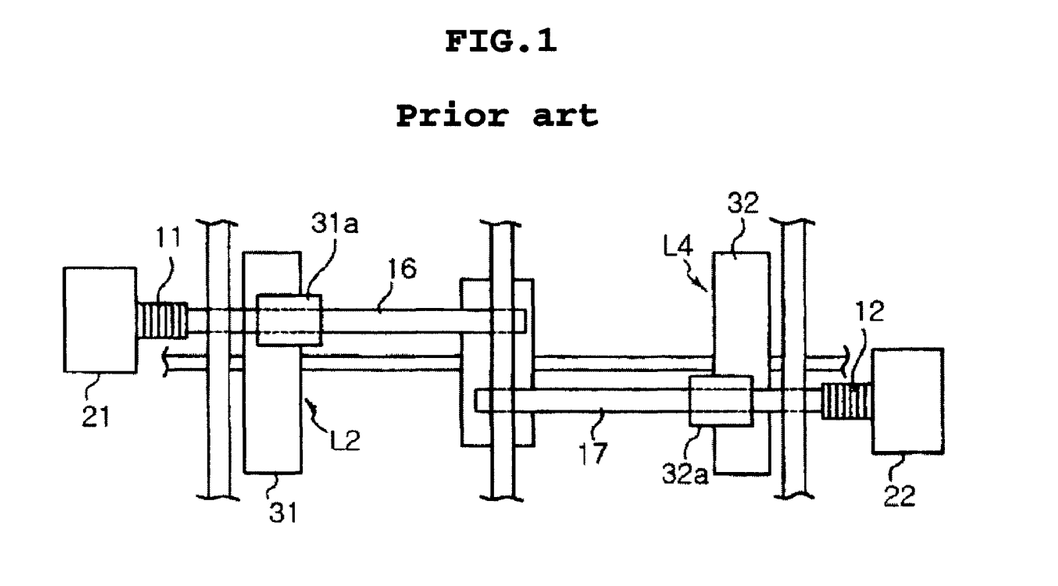
FIG. 1 is a sectional view illustrating a conventional lens actuating module using a piezoelectric device.
Figure 2:
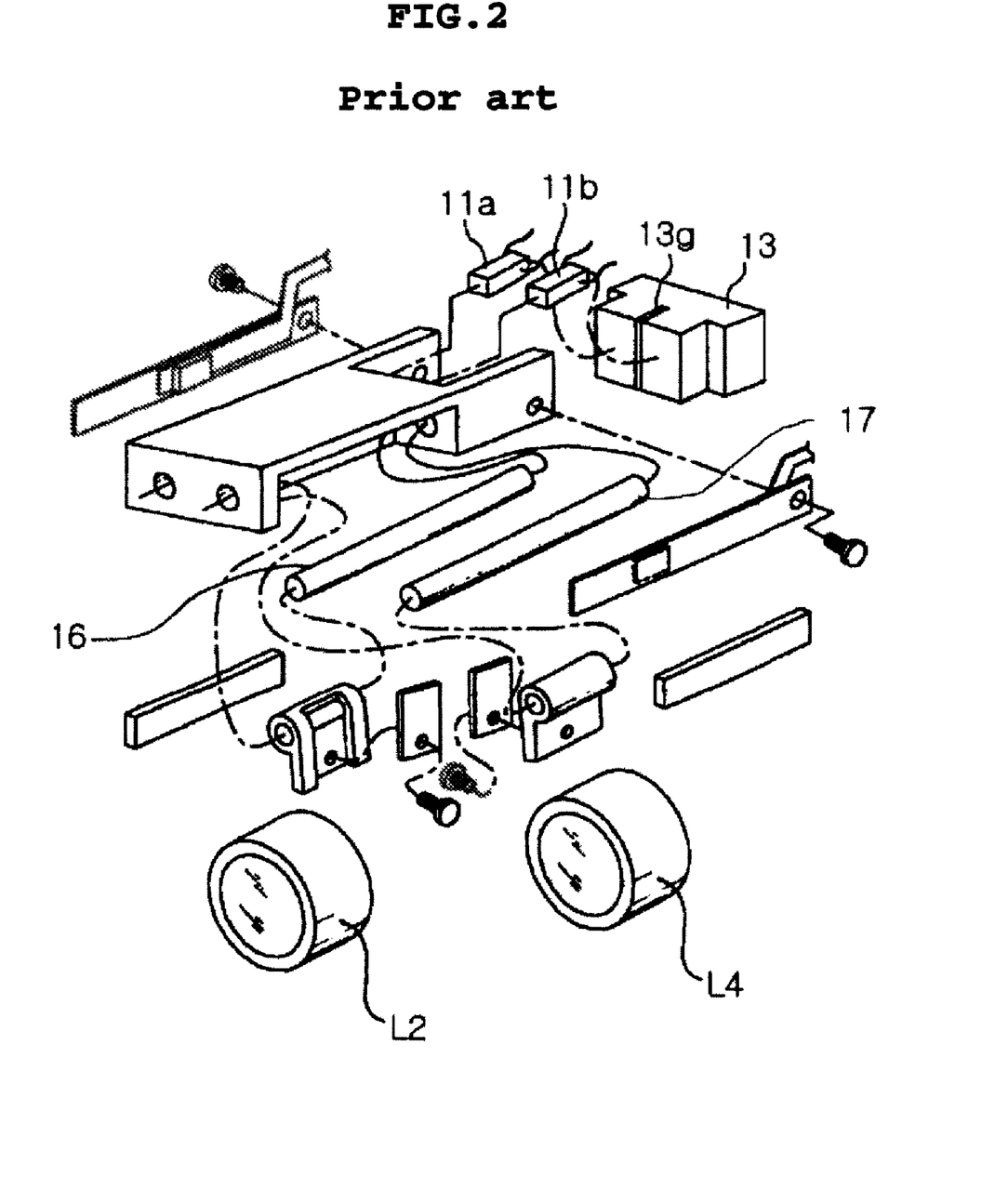
FIG. 2 is a view illustrating the assembly of the lens actuating module of FIG. 1.

A lens actuating module using a piezoelectric device is shown in FIGS. 1 and 2. FIG. 1 is a view illustrating the lens actuating module disclosed in U.S. Pat. No. 6,215,605. In the conventional lens actuating module, piezoelectric devices 11 and 12 are fixed to base blocks 21 and 22 and displacement is transmitted to driving rods 16 and 17, so that lenses L2 and L4 are transferred by preload generated from slide parts 31a and 32a, to inertia force of lens holders 31 and 32, and acceleration effect. According to the waveform of voltage applied to the piezoelectric device 12, the lens holder moves along with the driving rod or slides to stay in place, so that the lens is transferred. Further, the lens may be transferred in opposite directions.

When the lens actuating module of FIG. 1 is arranged in the configuration of FIG. 2, and the displacement of one of the piezoelectric devices 11a and 11b which are arranged to be adjacent to each other is transmitted through a base block 13, the displacement may be undesirably transmitted to another lens.

Thus, a groove 13g is formed in the base block 13 so as to prevent the transmission of displacement between piezoelectric devices. Such a groove complicates the structure, causes the lens actuating module to be difficult to manufacture, and cannot completely solve displacement interference between the piezoelectric devices.

Further, the length of each driving rod 16 or 17 which is moved forwards and backwards through the piezoelectric device 12 to transfer the lens is limited by the size of the piezoelectric device. The length restriction of the driving rods 16 and 17 limits the lens transfer length, so that it negatively affects the performance of a product.

Since the driving rods 16 and 17 are fixed, it is impossible to change the length of a barrel in which the lens is held. In addition to a space for the lens transfer length, an additional space for receiving driving elements is required, so that it is difficult to realize the miniaturization of an entire module. Further, only one end of the lens is supported by each driving rod 16 or 17, so that the lens has asymmetric displacement when the lens actuating module is driven, thus leading to unstable driving.

SUMMARY OF THE INVENTION

The present invention is intended to provide a lens actuating module, in which a to lens barrel in a camera module is moved by the contracted or extended amount of a shape memory alloy wire, thus realizing a simple structure and miniaturization.

Further, the present invention is intended to provide a lens actuating module, which prevents a lens barrel from leaning or rotating when the lens actuating module is actuated, thus improving the actuating reliability of the lens actuating module.

In an exemplary lens actuating module according to an embodiment of the present invention, a housing has an accommodating space, with a bush guide provided at a predetermined position on the housing in such a way as to be parallel to a direction of an optical axis. A lens barrel is accommodated in the accommodating space, and includes a lens and a barrel hook protruding from an outer circumference of the lens barrel. A driving unit applies a driving force to a bush such that the bush is moved up in the direction of the optical axis, by pulling force of contraction of a shape memory alloy wire locked at both ends thereof to the housing, the bush being guided by the bush guide and engaging with the barrel hook. A rotary member is interposed between the housing and the lens barrel. A preload unit pulls the lens barrel in the direction of the optical axis such that the lens barrel moves down to an original position, and pulls the lens barrel in a direction perpendicular to the optical axis such that a contact of the lens barrel with the rotary member is maintained.

The preload unit may comprise an elastic member which is placed obliquely such that a first end thereof is locked to an inner circumference of the housing and a second end thereof is locked to an outer circumference of the lens barrel.

The preload unit may include a magnet provided on the inner circumference of the housing, and a yoke provided on the outer circumference of the lens barrel which faces the inner circumference of the housing and having a center which is different from the magnet in the direction of the optical axis, a magnetic attractive force acting between the magnet and the yoke.

Further, the preload unit may include a magnet provided on the inner circumference of the housing, a yoke provided on the outer circumference of the lens barrel which faces the inner circumference of the housing and having a center which is equal to or different from the magnet in the direction of the optical axis, a magnetic attractive force acting between the magnet and the yoke, and an elastic member protruding from an upper surface of the lens barrel.

The elastic member may be a coil spring or a plate spring.

Further, a crimp may be locked to an outer circumference of the housing and the shape memory alloy wire may be connected at both ends thereof to the crimp which supplies current.

At least one barrel guide part may protrude from the outer circumference of the lens barrel, and at least one housing guide part may be provided on the inner circumference of the housing and engage with the barrel guide part to guide insertion and vertical actuation of the lens barrel.

Further, the barrel guide part may comprise a plurality of barrel guide parts, and the housing guide part may comprise a plurality of housing guide parts.

The housing guide part may include a rotary member receiving hole to receive a rotary member, and the barrel guide part may be actuated in the direction of the optical axis by a driving force of the driving unit while the barrel guide part contacting the rotary member.

Further, the rotary member may be a guide ball.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be to interpreted as having meanings and concepts relevant to the technical scope of the present invention based on the rule according to which an inventor can appropriately define the concept of the terms to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention might obscure the gist of the present invention, the detailed description thereof will be omitted.

Hereinafter, the preferred embodiments of the present invention will be described in detail with reference to the accompanying drawings.

Lens Actuating Module

First Embodiment

Figure 3:
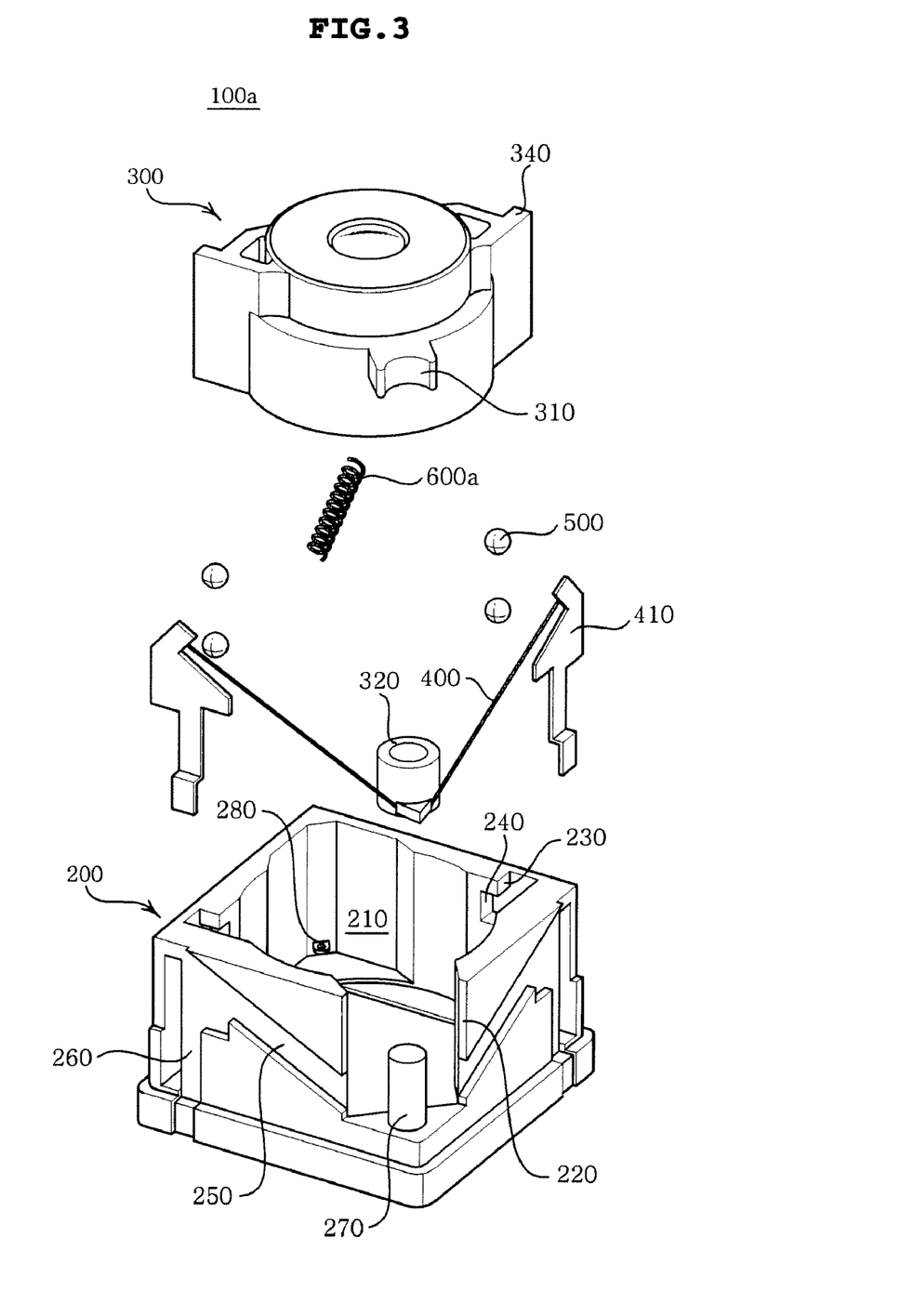
FIG. 3 is an exploded perspective view illustrating a lens actuating module according to a first embodiment of the present invention.
Figure 4:
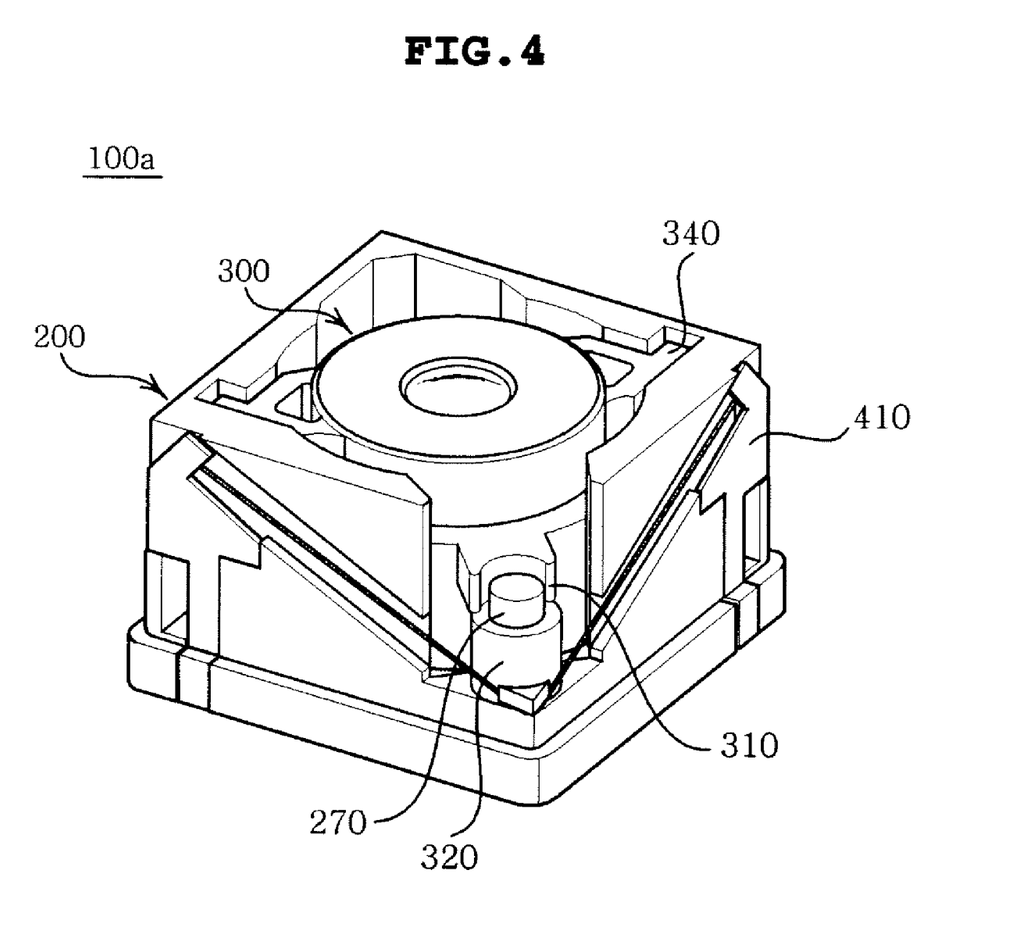
FIG. 4 is a perspective view illustrating the assembled state of the lens actuating module of FIG. 3.
Figure 5:
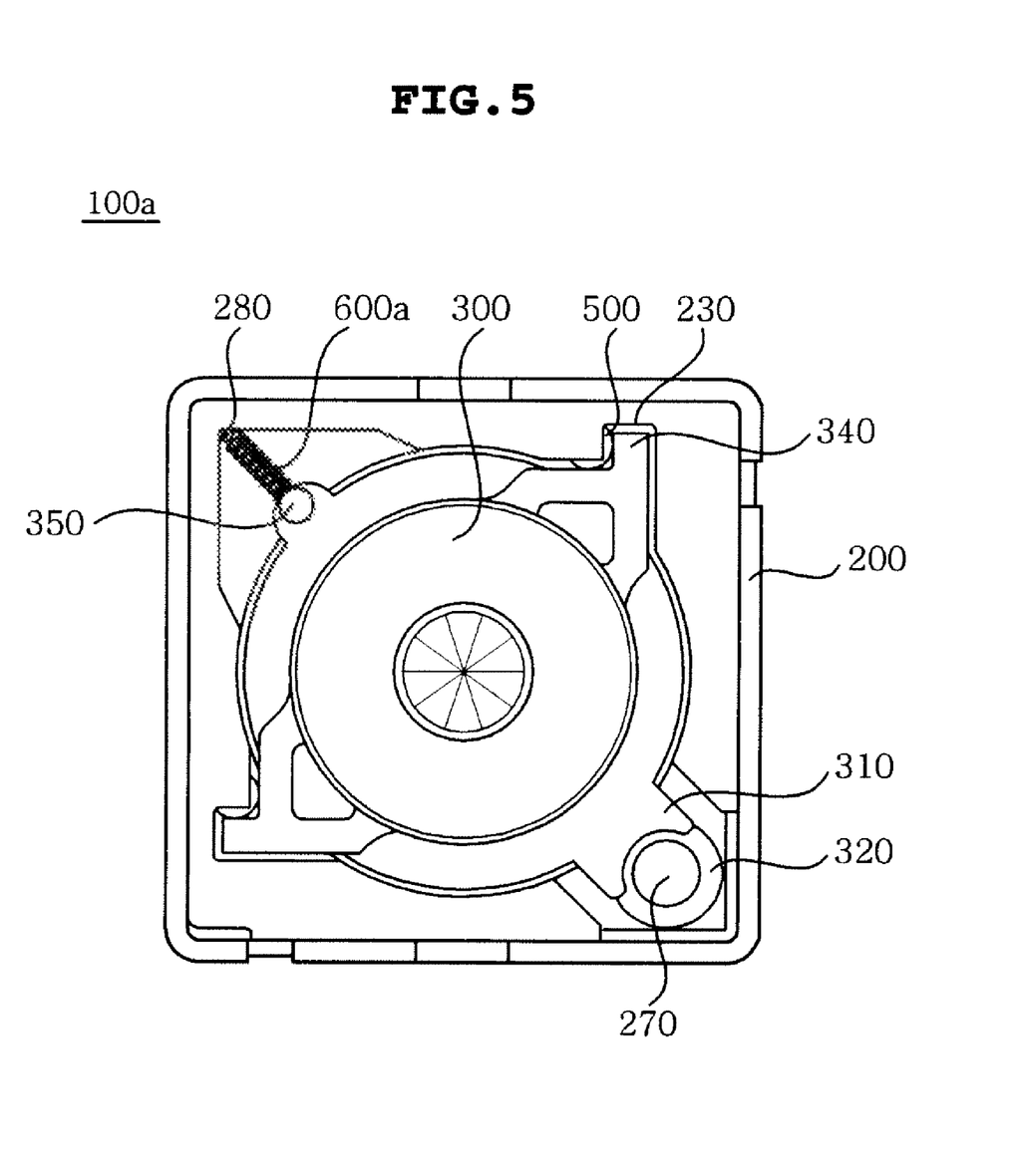
FIG. 5 is a plan view illustrating the assembled state of the lens actuating module of FIG. 3.

FIG. 3 is an exploded perspective view illustrating a lens actuating module according to a first embodiment of the present invention, FIG. 4 is a perspective view illustrating the assembled state of the lens actuating module of FIG. 3, and FIG. 5 is a plan view illustrating the assembled state of the lens actuating module of FIG. 3. Hereinafter, the lens actuating module 100a according to this embodiment will be described with reference to the accompanying drawings.

As shown in FIGS. 3 to 5, the lens actuating module 100a according to this embodiment includes a housing 200, a lens barrel 300 installed in the housing 200, a driving unit for actuating the lens barrel 300 in the direction of an optical axis using a shape memory alloy (SMA) wire 400, rotary members 500, and a preload unit 600a.

The housing 200 serves to provide a space for accommodating the lens barrel 300, and is constructed so that its upper end is open and an accommodating space 210 having a shape corresponding to the contour of the lens barrel 300 such that the accommodating space 210 is in close contact with the lens barrel 300 to support it is defined in the central portion of the housing 200.

One corner of the housing 200 is formed to be stepped downwards, thus providing an open part 220 which is open at its upper portion. The open part 220 provides a space for vertically actuating a barrel hook 310 which protrudes from the outer circumference of the lens barrel 300 such that the barrel hook 310 is exposed to the outside of the housing 200. Further, a bush guide 270 extending in the direction of the optical axis is provided on one corner of the housing 200 having the open part 220. When a bush 320 which will be described later is fitted over the bush guide 270 and is driven by the SMA wire 400, the bush guide 270 guides the bush 320 in the direction of the optical axis, thus preventing the lens barrel 300 from leaning or rotating. For example, the bush guide 270 has a cylindrical shape and is formed such that its length is shorter than that of the housing 200.

Further, a housing guide part 230 is provided on the inner circumference of the housing 200 and engages with a barrel guide part 340 which is provided on the outer circumference of the lens barrel 300 so as to guide the insertion of the lens barrel 300 into the housing 200 and prevent the leaning and rotation of the lens barrel 300 when it is inserted into the housing 200 and is actuated vertically. For example, the housing guide part 230 has the structure of a groove which receives the barrel guide part 340 protruding from the outer circumference of the lens barrel 300. Preferably, one pair of housing guide parts 230 is provided to face each other in a diagonal direction so as to prevent the leaning and rotation of the lens barrel 300. For example, the housing guide parts 230 are provided on both corners which are placed in a direction of crossing the corner of the housing 200 having the open part 220. However, the structure and arrangement of the housing guide parts 230 are exemplary for reliably guiding the lens barrel 300 and may be changed as to long as the housing guide parts 230 can perform the same function. The change of the housing guide parts 230 also falls within the scope of the present invention. Further, rotary member receiving holes 240 for receiving the rotary members 500 are formed in the housing guide parts 230 and reduce friction with the barrel guide part 340 provided on the lens barrel 300, thus helping the vertical movement of the lens barrel 300. The rotary member receiving holes 240 will be described in detail when describing the rotary members 500.

Further, a housing locking part 280 is provided on the inner circumference of the housing 200, preferably the lower end of a corner of the housing 200 which faces a corner of the housing 200 in a diagonal direction, and functions to lock one end of the preload unit 600a.

Meanwhile, wire guide channels 250 and crimp locking grooves 260 are formed in the outer circumference of the housing 200. Each wire guide channel 250 is formed in the shape of a stepped part to limit the moving range of the SMA wire 400. Each crimp locking groove 260 is connected to one end of the wire guide channel 25 to lock a crimp 410 to which power is supplied. Here, the wire guide channels 250 are formed to be inclined upwards from a lower end of one corner of the housing 200 having the open part 220 to both sides of the housing 200. Further, the crimp locking grooves 260 are formed on both sides of the housing 200 having the wire guide channels 250 in such a way that each crimp locking groove 260 has a shape corresponding to that of the crimp 410. The wire guide channels 250 and the crimp locking grooves 260 may be changed in consideration of the number and arrangement of the SMA wire 400 which is used.

The lens barrel 300 brings an image of a subject into a camera module through a lens, and comprises a hollow cylindrical lens holder having an accommodating space of a predetermined size such that at least one lens is arranged in the optical axis.

Here, the lens barrel 300 has at a predetermined position on its outer circumference to the barrel hook 310 which engages with the bush 320 such that an actuating force is transmitted to the lens barrel 300 in the direction of the optical axis. The barrel hook 310 is provided at a predetermined position on the upper end of the lens barrel 300 in such a way as to extend outwards. In the state where one side of the lens barrel 300 having the barrel hook 310 is aligned with the corner of the housing 200 having the open part 220, the lens barrel 300 is accommodated in the housing 200 and is exposed through the open part 220 to the outside of the housing 200.

Preferably, the barrel guide part 340 is provided on the outer circumference of the lens barrel 300 to engage with the corresponding housing guide part 230 of the housing 200. The barrel guide part 340 slidably engages with the housing guide part 230, thus helping the insertion and vertical actuation of the lens barrel 300 and preventing the leaning and rotation of the lens barrel 300. The barrel guide part 340 is formed at a position corresponding to the housing guide part 230 such that the barrel guide part 340 engages with the housing guide part 230. For example, the barrel guide part 340 may protrude from the outer circumference of the lens barrel 300 such that the barrel guide part 340 engages with the housing guide part 230 having the structure of a groove. In the state where the barrel guide part 340 engages with the housing guide part 230, the barrel guide part 340 is in slidable contact with the rotary members 500, thus allowing the lens barrel 300 to be actuated up and down under the condition of reduced frictional force.

Meanwhile, a barrel locking part 350 is provided on the outer circumference of the lens barrel 300, preferably at a position on the outer circumference of the lens barrel 300 facing in a diagonal direction the position of the lens barrel 300 having the barrel hook 310. The other end of the preload unit 600a which will be described later is locked to the barrel locking part 350.

The driving unit functions to apply an actuating force to the lens barrel 300 using the contraction and extension of the shape memory alloy. The driving unit controls the to actuating displacement of the lens barrel 300 using a rise in temperature and thermal condensation/cold expansion characteristics generated by current applied to the SMA wire 400.

In the state where both ends of the SMA wire 400 are secured to the outer circumference of the housing 200, a part of the SMA wire 400 between both ends contacts the bush 320 which is fitted over the bush guide 270 of the housing 200 to be guided. When power is applied to the SMA wire 400, the SMA wire 400 contracts or expands, thus applying an actuating force to the bush 320. At this time, both ends of the SMA wire 400 are connected to the crimps 410 supplying current and locked to the outer circumference of the housing 200. The locking and connecting method is not limited to a specific method, and a variety of methods including adhesion and welding may be used. Meanwhile, referring to the drawings, current is supplied to the SMA wire 400 using the crimps 410. But, a power supply structure and a conductive connection method are not limited to a specific structure and a specific connection method, and may be achieved by known related art.

Before current is supplied to the SMA wire 400, the SMA wire 400 maintains an extended state and the lens barrel 300 is placed at the lower end of the housing 200, that is, an initial position. When current is supplied by the crimps 410, the SMA wire 400 is contracted by rising temperature generated by its own resistance heat, so that the lens barrel 300 is moved up in the direction of the optical axis by the pulling force of the contraction. Subsequently, when the current is cut off, the SMA wire 400 is extended, and the preload unit 600a provides a restoring force to the lens barrel 300 in a direction opposite to that of the pulling force, so that the lens barrel 300 returns to its original position. Meanwhile, the operation of the preload unit 600a will be described below in detail.

The bush 320 is fitted over the cylindrical bush guide 270 to be guided thereby, thus transmitting an actuating force from the SMA wire 400 to the lens barrel 300. The bush 320 is formed in the shape of a cylinder which has a hollow portion therein such that the bush 320 is fitted over the bush guide 270. Here, in the state where the bush 320 is guided to the bush guide 270 in the direction of the optical axis, the bush 320 is actuated vertically, thus preventing the lens barrel 300 from leaning from the direction of the optical axis or rotating, therefore improving the actuating reliability of the lens.

The rotary members 500 are interposed between the housing 200 and the lens barrel 300 to reduce a frictional force between the lens barrel 300 and the housing 200 by rotary motion, thus enabling the lens barrel 300 to be easily actuated in a vertical direction. Each rotary member 500 comprises a guide ball which reduces a contact area to minimize the frictional force.

Here, the rotary member 500 is rotatably supported with a part of each rotary member 500 being received in the corresponding rotary member receiving hole 240 formed in the inner circumference of the housing 200. A remaining part of the rotary member 500 is in contact with and supported by the barrel guide part 340 of the lens barrel 300, thus aiding in actuating the barrel guide part 340 vertically. The barrel guide part 340 is in contact with and supported by the rotary member 500, thus allowing the lens barrel 300 to be actuated in a straight line while preventing the leaning of the lens barrel 300.

In order to maintain the contact of the rotary member 500 with the barrel guide part 340, a force must be applied to the barrel guide part 340 towards the rotary member 500, that is, in a direction perpendicular to the optical axis. The preload unit 600*a* which will be described below applies a force to the lens barrel 300 in a direction perpendicular to the optical axis. This will be described in detail when describing the preload unit 600*a*.

Meanwhile, referring to the drawings, the rotary member receiving holes 240 are formed in the inner circumference of the housing 200. But, another structure in which the rotary member receiving hole 240 is formed in the barrel guide part 340 such that a part of the rotary member 500 is rotatably supported by the barrel guide part 340 and a remaining part is supported by the housing guide part 230 may be used. Such a structure also falls within the scope of the present invention.

The preload unit 600*a* provides a restoring force such that the lens barrel 300 moved upwards is restored to its original position, and functions to maintain the contact of the lens barrel 300 with the rotary members 500. The preload unit 600*a* comprises a spring member which is placed obliquely such that one end is connected to the housing locking part 280 provided on the inner circumference of the housing 200 and the other end is connected to the barrel locking part 350 provided on the outer circumference of the lens barrel 300.

That is, the spring member placed obliquely provides a restoring force for moving the lens barrel 300 down, and pulls the lens barrel 300 in a direction opposite to that of the pulling force of contraction of the SMA wire 400, that is, in the optical axis direction towards a lower position. Further, the spring member provides a force for pulling the lens barrel 300 towards the rotary members 500 in a direction perpendicular to the optical axis such that the lens barrel 300 is in contact with the rotary members 500.

A coil spring may be used as the spring member. By obliquely placing the spring member, bi-directional forces are realized only by a single spring member.

Lens Actuating Module

Second Embodiment

Figure 6:
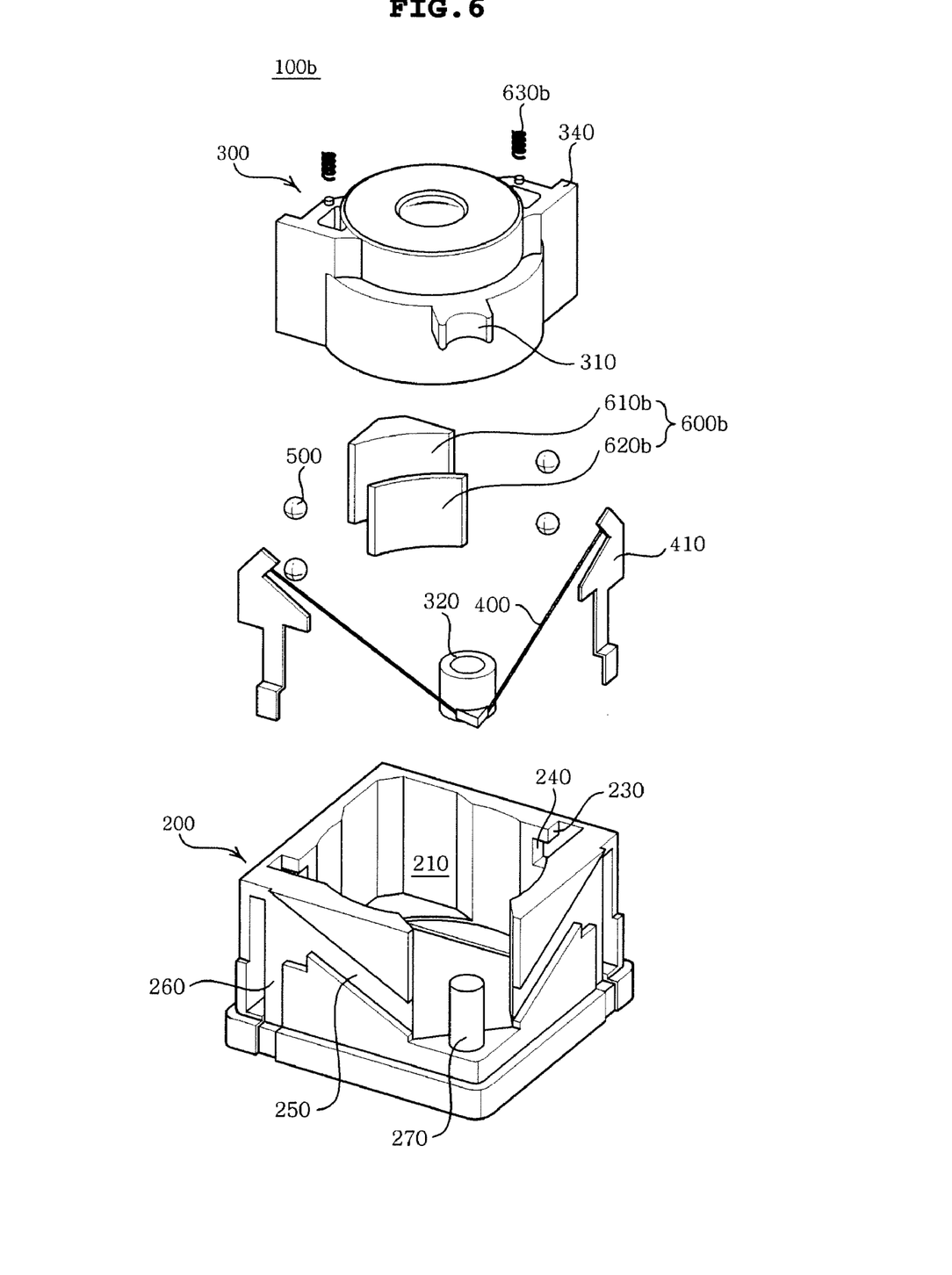
FIG. 6 is an exploded perspective view illustrating a lens actuating module according to a second embodiment of the present invention.
Figure 7:
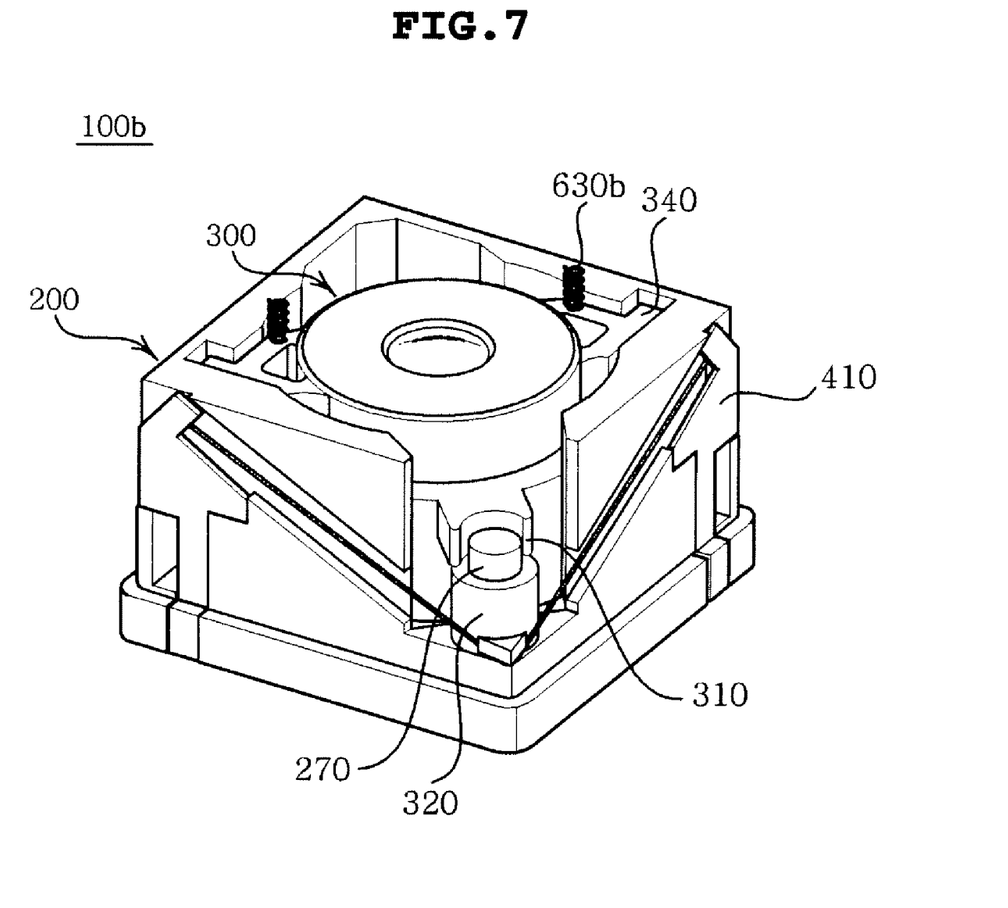
FIG. 7 is a perspective view illustrating the assembled state of the lens actuating module of FIG. 6.
Figure 8:
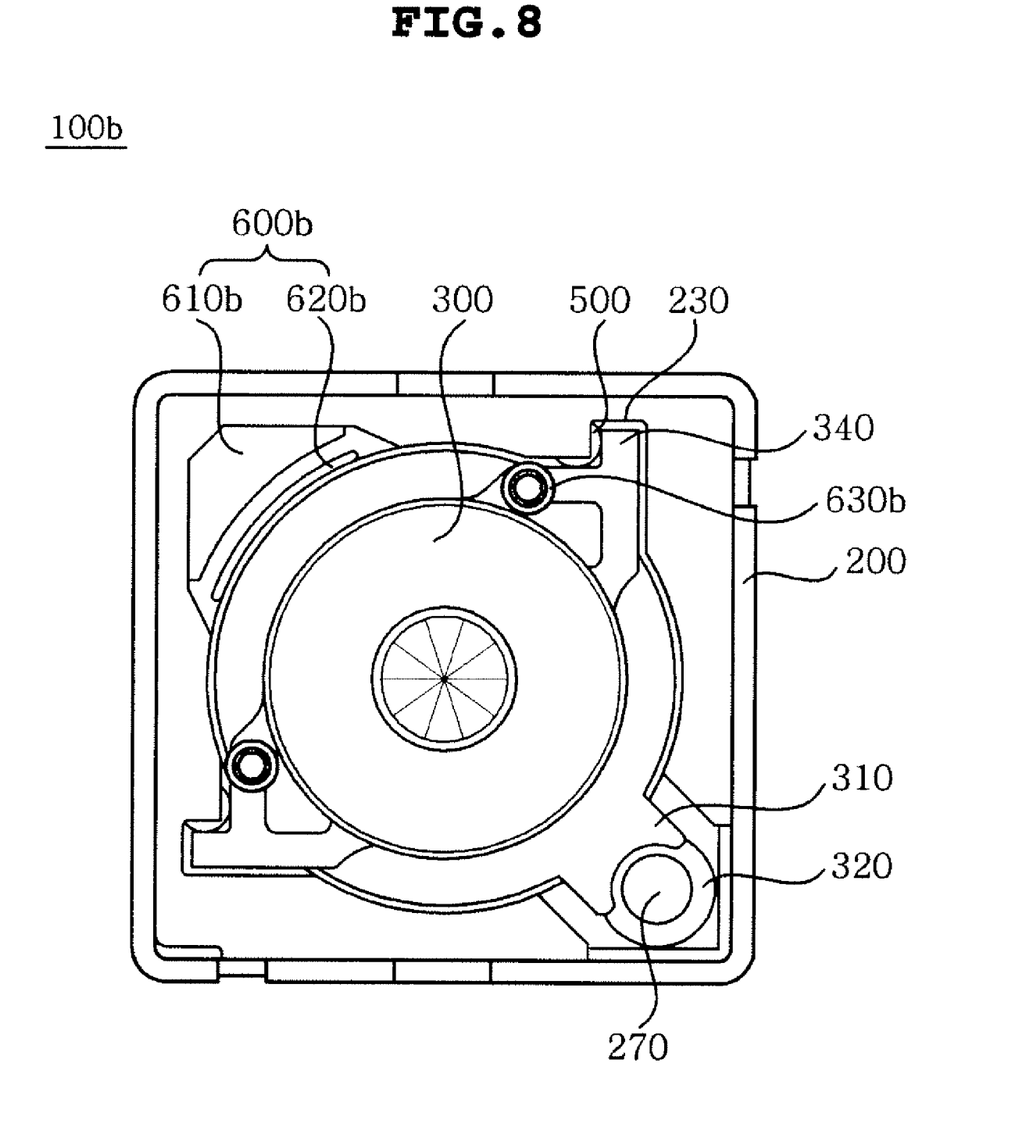
FIG. 8 is a plan view illustrating the assembled state of the lens actuating module of FIG. 6.

FIG. 6 is an exploded perspective view illustrating a lens actuating module according to a second embodiment of the present invention, FIG. 7 is a perspective view illustrating the assembled state of the lens actuating module of FIG. 6, and FIG. 8 is a plan view illustrating the assembled state of the lens actuating module of FIG. 6. Since the second embodiment is identical with the first embodiment except for the construction of a preload unit 600*b*, elements common to both the embodiments will carry the same to reference numerals and duplicate descriptions will be omitted herefrom. Hereinafter, a lens actuating module 100*b* according to this embodiment will be described with reference to the accompanying drawings.

As shown in FIGS. 6 to 8, the preload unit 600*b* of the lens actuating module 100*b* according to this embodiment includes a magnet 610*b*, a yoke 620*b*, and elastic members 630*b*. The magnet 610*b* is provided on the inner circumference of the housing 200. The yoke 620*b* is provided on the outer circumference of the lens barrel 300 facing the inner circumference of the housing 200, and has a center which is equal to or different from the magnet 610*b* in the direction of the optical axis, with a magnetic attractive force acting between the yoke 620*b* and the magnet 610*b*. The elastic members 630*b* protrude from the upper surface of the lens barrel 300.

The magnet 610*b* and the yoke 620*b* function to apply a preload to the lens barrel 300 using the magnetic attractive force. According to this embodiment, the elastic members 630*b* apply force to the lens barrel 300 in a direction opposite to that of the pulling force of contraction of a SMA wire 400. The magnet 610*b* and the yoke 620*b* are placed to have the same center in the direction of the optical axis, and apply the force of pulling the lens barrel 300 in a direction perpendicular to the optical axis using magnetic attractive force such that the lens barrel 300 contacts the rotary members 500.

Each elastic member 630*b* protrudes from the upper surface of the lens barrel 300, and applies force to the lens barrel 300 in a direction opposite to that of the pulling force of contraction using the elastic force of contraction of a casing which covers the housing 200 when the lens barrel 300 moves up. A coil spring may be used as the elastic member 630*b*.

Meanwhile, although not shown in the drawings, the preload unit 600*b* is constructed to use the magnetic attractive force of the magnet 610*b* with the yoke 620*b*, but the magnet 610*b* and the yoke 620*b* may be placed such that the center of the magnet to 610*b* is different from that of the yoke 620*b* in the direction of the optical axis. Such a construction provides a force pulling the lens barrel 300 in the direction opposite to that of the pulling force of contraction of the SMA wire 400, that is, in the optical axis direction towards a lower position, and a force pulling the lens barrel 300 towards the rotary members 500 in a direction perpendicular to the optical axis such that the lens barrel 300 comes into contact with the rotary members 500.

Lens Actuating Module

Third Embodiment

Figure 9:
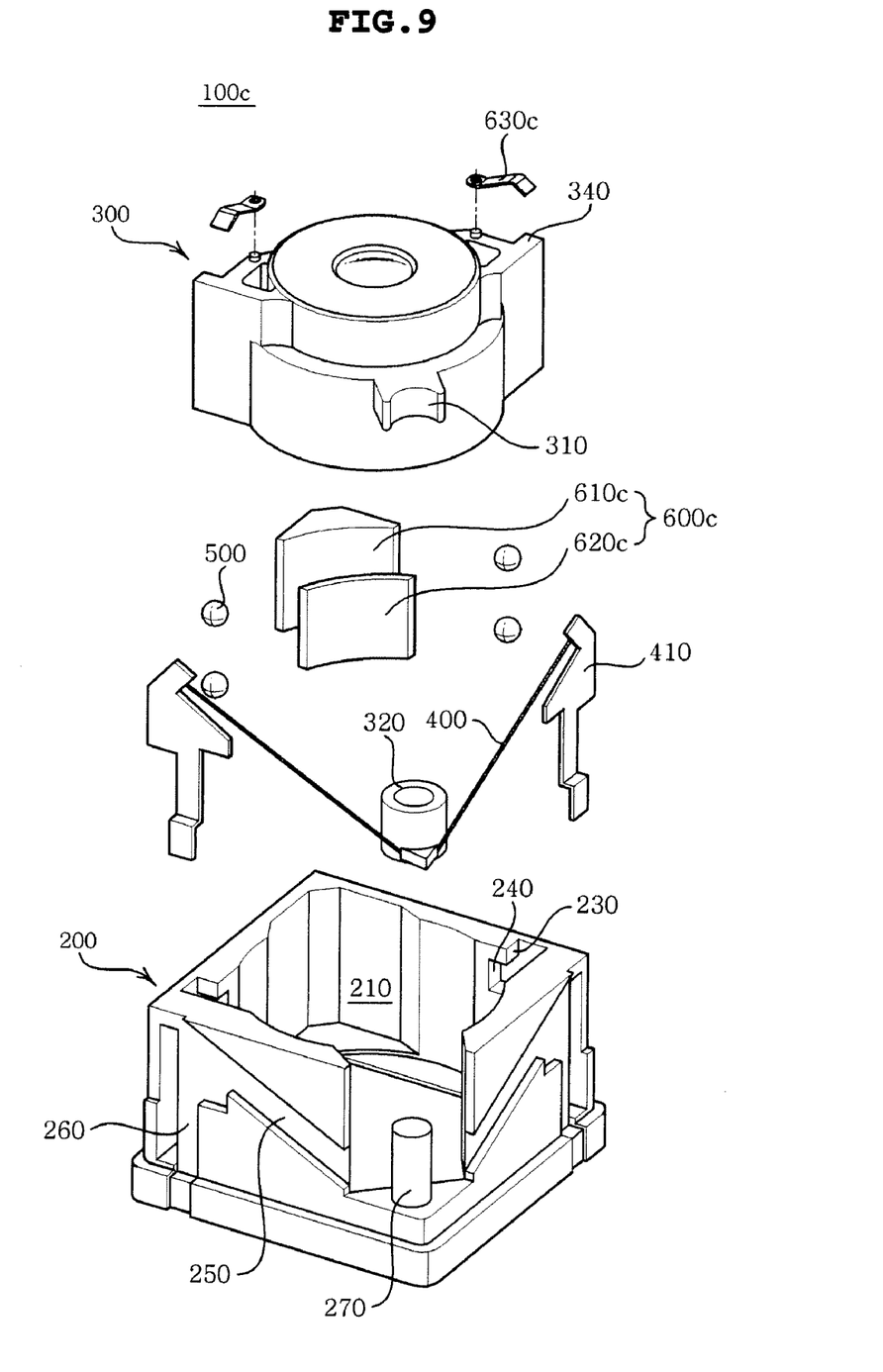
FIG. 9 is an exploded perspective view illustrating a lens actuating module according to a third embodiment of the present invention.
Figure 10:
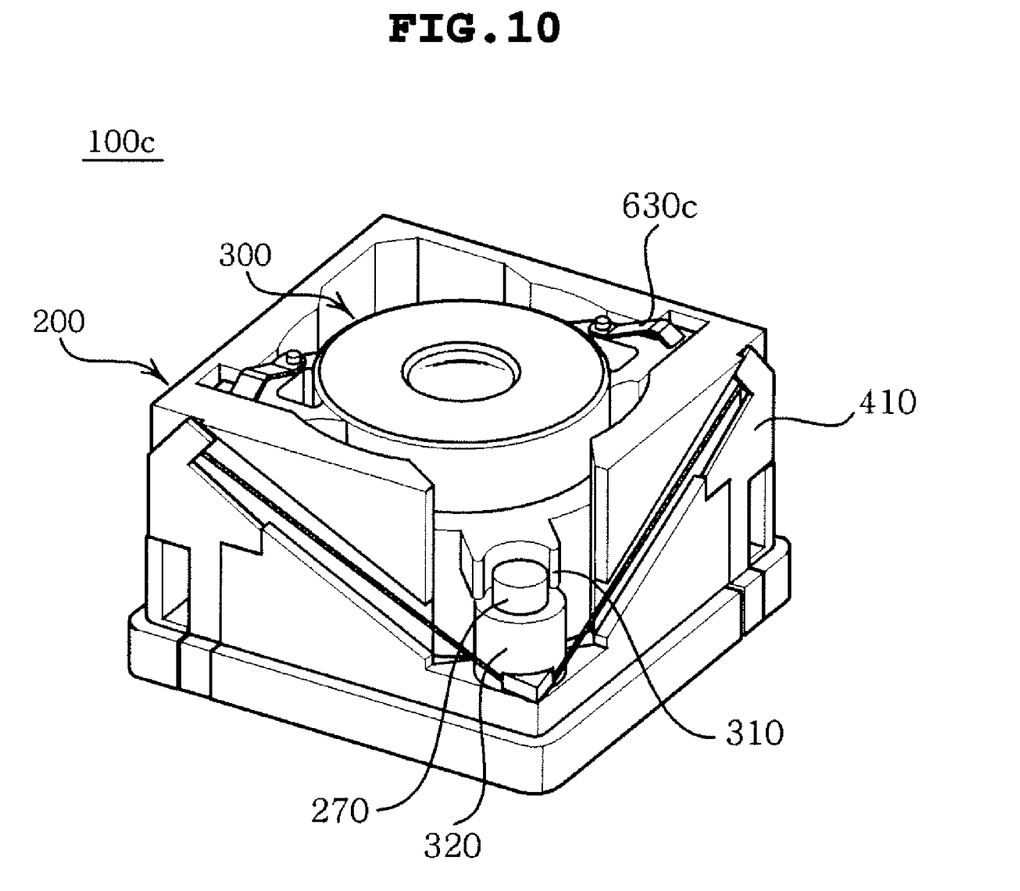
FIG. 10 is a perspective view illustrating the assembled state of the lens actuating module of FIG. 9.
Figure 11:
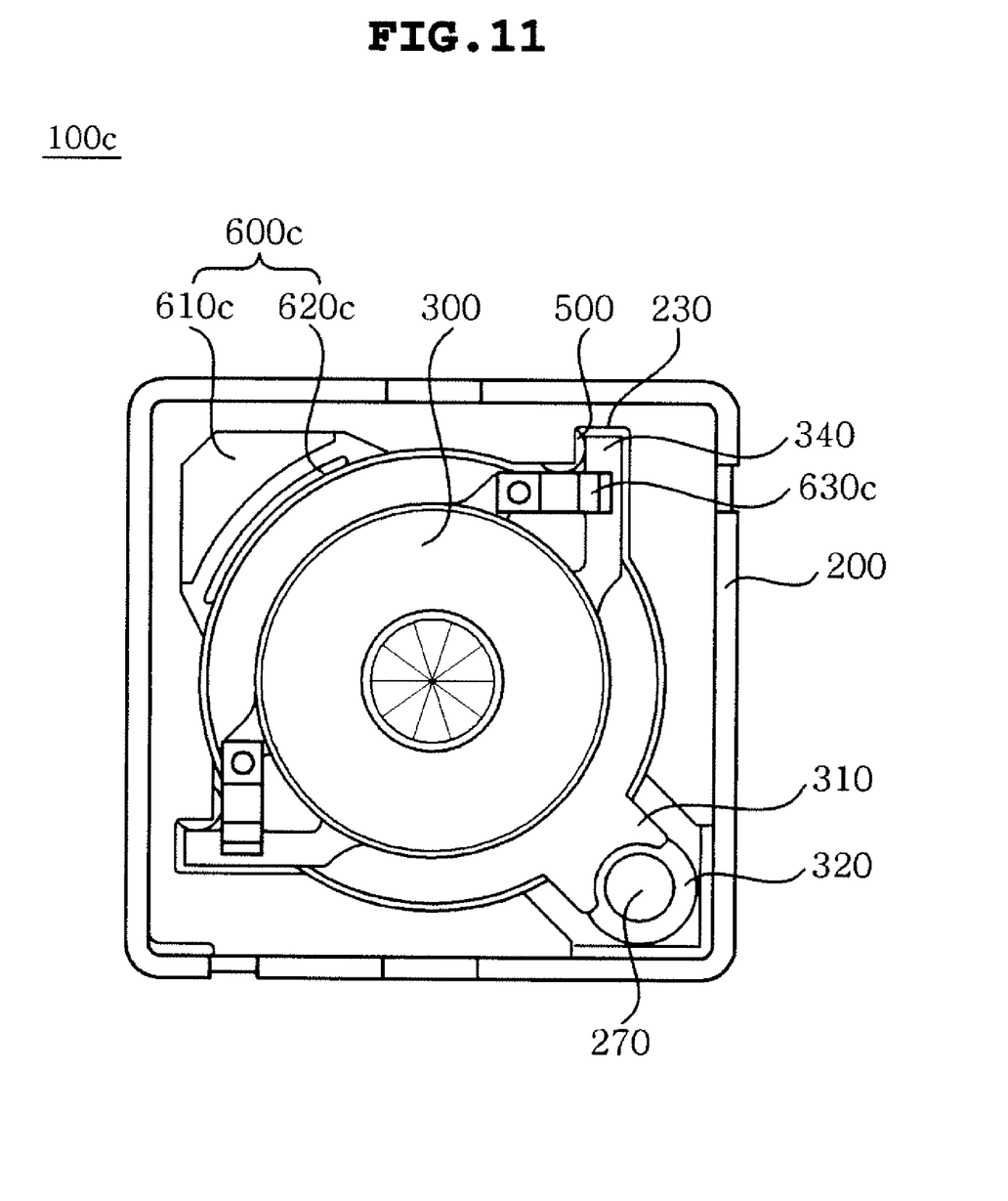
FIG. 11 is a plan view illustrating the assembled state of the lens actuating module of FIG. 9.

FIG. 9 is an exploded perspective view illustrating a lens actuating module according to a third embodiment of the present invention, FIG. 10 is a perspective view illustrating the assembled state of the lens actuating module of FIG. 9, and FIG. 11 is a plan view illustrating the assembled state of the lens actuating module of FIG. 9. Since the third embodiment is identical with the above-mentioned embodiments except for the construction of a preload unit 600*b* for the lens barrel, elements common to the embodiments will carry the same reference numerals and duplicate descriptions will be omitted herefrom. Hereinafter, a lens actuating module 100*c* according to this embodiment will be described with reference to the accompanying drawings.

As shown in FIGS. 9 to 11, the lens actuating module 100*c* according to this embodiment uses a plate spring as an elastic member 630*c* unlike the lens actuating module 100*b* according to the second embodiment. Here, since the plate spring performs the same function as the coil spring of the second embodiment, the detailed description of the plate spring will be omitted.

As described above, the present invention provides a lens actuating module, in which a lens barrel in a camera module is moved by the contracted or extended amount of a shape memory alloy wire, thus realizing a simple structure and miniaturization.

Further, the present invention provides a lens actuating module, in which a bush to guide is formed in a housing vertically in a direction of an optical axis, and a bush is guided by the bush guide in the direction of the optical axis, thus transmitting an actuating force such that a lens barrel does not lean or rotate, therefore improving actuating reliability.

Furthermore, the present invention provides a lens actuating module, in which a rotary member such as a guide ball is interposed between a lens barrel and a housing to reduce a contact area, thus minimizing frictional force when the lens barrel is actuated vertically relative to the housing.

Further, the present invention provides a lens actuating module, in which a preload unit of a simple structure such as an elastic member and/or a magnet and a yoke provides a restoring force so that a lens barrel returns to its original position, and transmits a force for maintaining the contact of the lens barrel with a rotary member.

Furthermore, the present invention provides a lens actuating module, in which a bush actuated by a shape memory alloy wire is supported by a bush guide, thus allowing a lens barrel from being vertically actuated without leaning from the direction of an optical axis.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A lens actuating module, comprising:
   a housing having an accommodating space, with a bush guide provided at a predetermined position on the housing in such a way as to be parallel to a direction of an optical axis;
   a lens barrel accommodated in the accommodating space, and including a lens and a barrel hook protruding from an outer circumference of the lens barrel;
   a driving unit applying a driving force to a bush such that the bush is moved up in the direction of the optical axis, by pulling force of contraction of a shape memory alloy wire locked at both ends thereof to the housing, the bush being guided by the bush guide and engaging with the barrel hook;
   a rotary member interposed between the housing and the lens barrel; and
   a preload unit pulling the lens barrel in the direction of the optical axis such that the lens barrel moves down to an original position, and pulling the lens barrel in a direction perpendicular to the optical axis such that a contact of the lens barrel with the rotary member is maintained.

2. The lens actuating module as set forth in claim 1, wherein the preload unit comprises an elastic member which is placed obliquely such that a first end thereof is locked to an inner circumference of the housing and a second end thereof is locked to an outer circumference of the lens barrel.

3. The lens actuating module as set forth in claim 1, wherein the preload unit comprises:
   a magnet provided on the inner circumference of the housing; and
   a yoke provided on the outer circumference of the lens barrel which faces the inner circumference of the housing, and having a center which is different from the magnet in the direction of the optical axis, a magnetic attractive force acting between the magnet and the yoke.

4. The lens actuating module as set forth in claim 1, wherein the preload unit comprises:
   a magnet provided on the inner circumference of the housing;
   a yoke provided on the outer circumference of the lens barrel which faces the inner to circumference of the housing, and having a center which is equal to or different from the magnet in the direction of the optical axis, a magnetic attractive force acting between the magnet and the yoke; and
   an elastic member protruding from an upper surface of the lens barrel.

5. The lens actuating module as set forth in claim 4, wherein the elastic member comprises a coil spring or a plate spring.

6. The lens actuating module as set forth in claim 1, wherein a crimp is locked to an outer circumference of the housing and the shape memory alloy wire is connected at both ends thereof to the crimp which supplies current.

7. The lens actuating module as set forth in claim 1, wherein at least one barrel guide part protrudes from the outer circumference of the lens barrel, and
   at least one housing guide part is provided on the inner circumference of the housing and engages with the barrel guide part to guide insertion and vertical actuation of the lens barrel.

8. The lens actuating module as set forth in claim 7, wherein the barrel guide part comprises a plurality of barrel guide parts and the housing guide part comprises a plurality of housing guide parts.

9. The lens actuating module as set forth in claim 7, wherein the housing guide part comprises a rotary member receiving hole to receive a rotary member, and the barrel guide part is actuated in the direction of the optical axis by a driving force of the driving unit while the barrel guide part contacting the rotary member.

10. The lens actuating module as set forth in claim 1, wherein the rotary member comprises a guide ball.

* * * * *